UNITED STATES PATENT OFFICE.

GASTON D. THÉVENOT, OF MILWAUKEE, WISCONSIN.

PROCESS OF MANUFACTURING MILK AND CREAM SUBSTITUTES.

1,359,633. Specification of Letters Patent. Patented Nov. 23, 1920.

No Drawing. Application filed January 24, 1919. Serial No. 272,909.

*To all whom it may concern:*

Be it known that I, GASTON D. THÉVENOT, a citizen of the United States, residing at Milwaukee, county of Milwaukee, and State of Wisconsin, have invented new and useful Improvements in Processes of Manufacturing Milk and Cream Substitutes, of which the following is a specification.

My invention relates to improvements in processes of manufacturing milk and cream substitutes, and is based upon the discovery that such substitutes may be manufactured from vegetable material rich in albuminous matter, such, for example, as soya beans; that objectionable flavors and coloring matter may be removed, and a finished product obtained which possesses the appearance and taste of cow's milk, as well as its nourishing properties.

In carrying out my improved process, I first soak a quantity of soya beans in water until they are thoroughly saturated, whereupon I boil the mixture for a sufficient length of time to soften and sterilize the material, and remove coloring matter therefrom. By boiling the material, I also eliminate or destroy any objectionable raw taste or flavors which it might otherwise possess.

The solid portion of this cooked material is then separated from the water by draining, and after crushing it to a fine pulp, it is again mixed with a quantity of water, which has preferably been sterilized and made slightly alkaline. Thereupon the pulp is thoroughly distributed in the water by agitation, after which the mixture is allowed to stand until the heavier particles have settled, leaving a liquid which is again drained off, and which is milky in appearance, owing to the substances extracted from the pulp, and held in solution or suspension in the water. This liquid is also rich in albuminous substances, including fat, mineral matter, carbohydrates, and other organic substances found in cow's milk, in substantially the same proportions, except that the liquid is deficient in fats, and to a less extent is also deficient in sugar. Any suitable means for separating the liquid from the solid portion of the mixture may be employed in place of allowing the solid portions to settle, as above stated.

The density of the mixture, *i. e.*, the relative proportion of albuminous content, and of fats, mineral matter, etc., to the water will, of course, depend on the proportionate quantity of pulp and water in the mixture prepared as above described. But if it is desired to increase the albuminous content for a given quantity of pulp, a mixture of ground pulp and water may be digested with proteolytic enzym, such as pepsin, or papain, in the presence of a sufficient amount of sodium chlorid, which acts as an activating medium on the enzyms.

The object of having the water slightly alkaline is to neutralize the acidity of the material, and to remove any unnatural flavor or off-taste, which these acids would otherwise impart to the finished product.

After separating the liquid from the solid portions of the mixture, as above described, the liquid portion is subsequently emulsified in suitable apparatus, with additional quantities of fats and oils, to any desired degree of richness in these substances, dependent principally, however, upon whether the manufacture of a milk or a cream is desired. Small amounts of sugar and mineral matter, such as sodium chlorid, may be added at any stage of the process after the material has been cooked.

The resulting liquid contains the valuable ingredients of milk or cream, free from objectionable or unnatural flavor, and capable of concentration to any desired degree of consistency. In fact, the water may be entirely evaporated, and the product marketed as a dry powder, to be prepared for use by the consumer by merely adding water in any desired proportionate quantity to produce a thin or dense mixture, in accordance with the requirements.

The water employed for cooking the soya beans initially, when separated by draining or otherwise, can be concentrated or evaporated in order to reclaim and utilize such substances as have been taken up or dissolved from the material during the cooking process. Valuable by-products may thus be obtained.

It will be understood that while I have described my invention more particularly with reference to the production of artificial milk from soya beans, the same process may be utilized in the treatment of any vegetable rich in protein, for example, any of the legumes. But I have discovered that soya beans are not only exceedingly rich in albuminous material, but that they contain the ingredients of cow's milk to a greater extent and more nearly in proper proportion than any other material which I have tested; also that they contain less objectionable flavoring matter than other materials, and that it can be more effectively removed by the process herein described.

I claim:—

1. The process of manufacturing a liquid food, closely resembling cow's milk, consisting in boiling soya beans in water until the same are thoroughly cooked and the coloring matter removed, separating the cooked material from the water, and crushing it to a fine pulp, again mixing it with slightly alkaline water, and removing the liquid portion with such material as is dissolved or suspended therein.

2. The process of manufacturing liquid food from legumes, consisting in boiling the material in water until the same is thoroughly cooked, and draining off the water and crushing the material to a fine pulp, and mixing the pulp with water in sufficient quantity to thin the mixture to about the consistency of cow's milk.

3. The process of manufacturing liquid food from legumes, consisting in boiling the material in water until the same is thoroughly cooked, and draining off the water and crushing the material to a fine pulp, mixing the pulp with water in sufficient quantity to thin the mixture to about the consistency of cow's milk, and emulsifying the liquid with additional quantities of fats, oils and sugar.

4. The process of manufacturing liquid food, resembling cows milk, from vegetables, such as soya beans, which are rich in protein, consisting in cooking the vegetables until fairly softened and sterilized, and the coloring matter removed, removing the free liquid and crushing the cooked material to a fine pulp, mixing the pulp with sterilized and slightly alkaline water, separating the water and such materials as are dissolved and held in suspension therein, and adding thereto fats, oils, and sugar.

5. The process of manufacturing liquid food, resembling cow's milk, from vegetables, such as soya beans, which are rich in protein, consisting in cooking the vegetables until fairly softened and sterilized, and the coloring matter removed, removing the free liquid and crushing the cooked material to a fine pulp, mixing the pulp with sterilized and slightly alkaline water, digesting the albuminous content with proteolytic enzym in the presence of sodium chlorid, and separating the water and such materials as are dissolved and held in suspension therein, and adding thereto fats, oils, and sugar.

In testimony whereof I affix my signature in the presence of two witnesses.

GASTON D. THÉVENOT.

Witnesses:
LEVERETT C. WHEELER,
O. C. WEBER.